United States Patent
Schwartz

[15] 3,658,143
[45] Apr. 25, 1972

[54] FLEXURE PLATE SCALE WITH HYDRAULIC LOAD CELL

[72] Inventor: Linus G. Schwartz, Rohnert Park, Calif.
[73] Assignee: National Controls, Inc., Santa Rosa, Calif.
[22] Filed: Nov. 20, 1970
[21] Appl. No.: 91,496

[52] U.S. Cl. .................. 177/208, 177/141, 177/187, 177/229, 177/255, 177/257, 177/DIG. 9
[51] Int. Cl. .................. G01g 3/08, G01g 5/04, G01g 21/02
[58] Field of Search .................. 177/132–135, 141, 177/187, 188, 189, 195, 208, 209, 210, 163, 211, 229, 256–259, DIG. 8, DIG. 9

[56] References Cited

UNITED STATES PATENTS

| | | | |
|---|---|---|---|
| 278,905 | 6/1883 | Emery | 177/187 X |
| 1,759,886 | 5/1930 | Bousfield | 177/255 |
| 1,411,211 | 3/1922 | Hapgood | 177/257 |
| 3,464,509 | 9/1969 | Gray | 177/208 |
| 3,465,838 | 9/1969 | Kienzle et al. | 177/208 X |
| R27,056 | 2/1971 | Connors et al. | 177/188 X |
| 2,545,908 | 3/1951 | Weckerly | 177/195 |
| 2,802,660 | 8/1957 | Williams | 177/255 |
| 3,360,062 | 12/1967 | Patter | 177/210 X |
| 3,472,329 | 10/1969 | Smith | 177/132 X |
| 3,512,595 | 5/1970 | Laimins | 177/229 X |

FOREIGN PATENTS OR APPLICATIONS 785,718  11/1957  Great Britain ...................... 177/255

*Primary Examiner*—Robert S. Ward, Jr.
*Attorney*—Flehr, Hohbach, Test, Albritton & Herbert

[57] ABSTRACT

Platform scale having a simple lever system utilizing flexure plates and flexible cables to transmit forces from the platform to a hydraulic load cell to produce a hydraulic output signal having a pressure corresponding to the weight of an object placed on the platform.

6 Claims, 3 Drawing Figures 3,658,143

PATENTED APR 25 1972

INVENTOR.
LINUS G. SCHWARTZ

BY
Flehr, Hohbach, Test,
Albritton & Herbert
Attorneys

3,658,143

FLEXURE PLATE SCALE WITH HYDRAULIC LOAD CELL

BACKGROUND OF THE INVENTION

This invention pertains generally to weighing devices and more particularly to a scale of the type having a platform for receiving a load to be weighed.

Most platform scales heretofore provided utilize conventional pivots and bearings throughout their lever systems. These pivots and bearings are subject to wear which can impair the accuracy of the scale, and they require frequent maintenance and/or replacement.

Heretofore, there have been some attempts to replace the pivots and bearings of platform scales with flexible members such as plates, straps and cables. However, none of these attempts has provided entirely satisfactory results.

There is, therefore, a need for a new and improved scale which overcomes the foregoing and other disadvantages of scales heretofore provided.

SUMMARY AND OBJECTS OF THE INVENTION

The present invention provides a low profile platform scale having a simple lever system and a hydraulic load cell which produces a hydraulic output signal having a pressure corresponding to the weight of an object placed upon the platform of the scale. Forces are transmitted from the platform to the lever system through flexure plates, and flexible cables are used for transmitting forces from the lever system to the load cell. The resulting scale is compact in size, highly portable, rugged in construction and highly accurate.

It is in general an object of the invention to provide a new and improved scale of the platform type.

Another object of the invention is to provide a scale of the above character which utilizes flexure plates and flexible cables throughout its lever system.

Another object of the invention is to provide a scale of the above character which utilizes a hydraulic load cell to produce a hydraulic output signal having a pressure corresponding to the weight of an object on the platform.

Additional objects and features of the invention will be apparent from the description in which the preferred embodiment is set forth in detail in conjunction with the accompanying drawing.

DESCRIPTION OF THE PREFERRED EMBODIMENT

Figure 1:
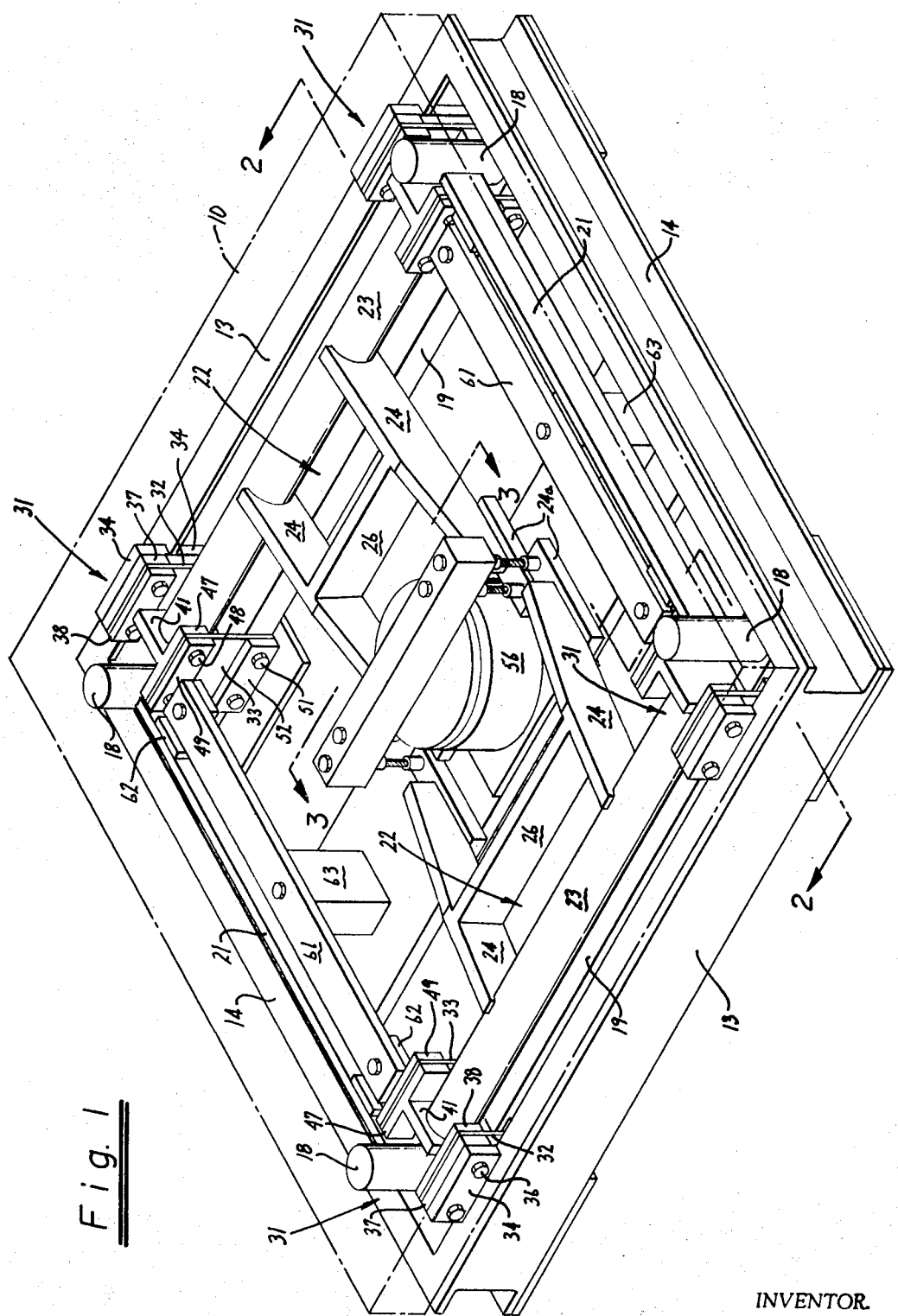
FIG. 1 is a perspective view of one embodiment of a platform scale incorporating the present invention, with the platform removed for clarity of illustration.
Figure 2:
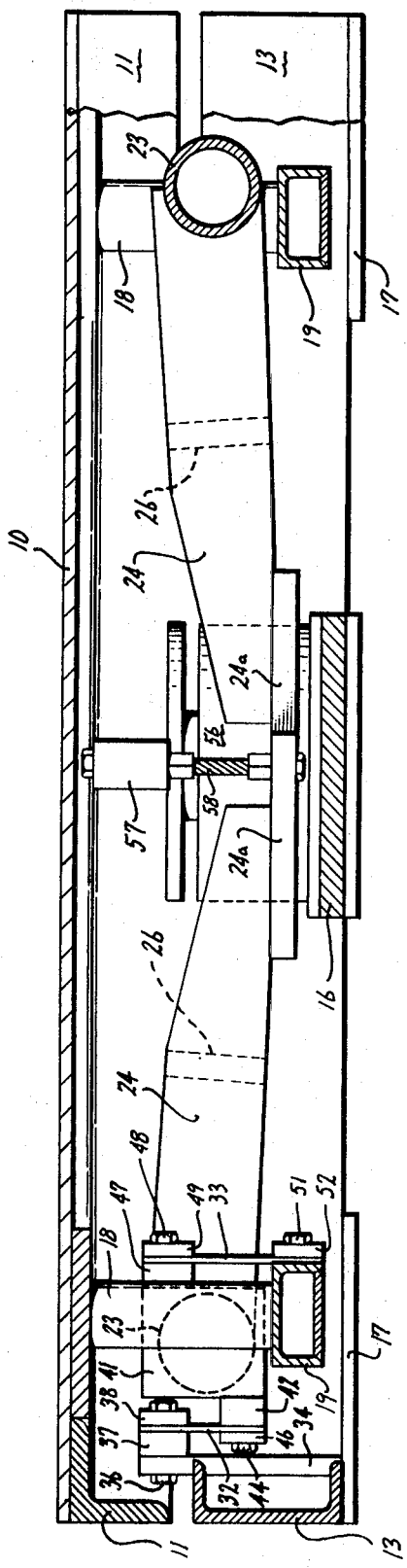
FIG. 2 is a cross-sectional view taken along line 2—2 in FIG. 1.

In the preferred embodiment, the scale of the present invention includes a platform for receiving loads to be weighed a generally rectangular base assembly, a framework disposed within the base assembly for supporting the platform, a pair of lever arms mounted within the base assembly, flexure plates connecting the lever arms to the platform supporting framework in such manner that forces applied to the platform by a load are transmitted to the lever arms, a hydraulic load cell, and flexible cable means connecting the lever arms to the load cell in such manner that the load cell produces a hydraulic output signal corresponding to the load on the platform.

The platform comprises a generally planar member 10 disposed in a substantially horizontal position above the base of the scale. A skirt 11, fabricated of rigid angle stock, extends around the outer periphery of the platform member 10. Alternatively, if desired, the skirt can be fabricated of channel stock, box beam stock, or stock having another structural shape. This skirt adds strength and rigidity to the platform and it also provides means for enclosing the upper portion of the scale. It is attached to the platform member 10 by conventional means such as bolting, brazing, or welding. Other structural cross-members are included in the platform and attached to planar member 10 and skirt 11 to provide structural rigidity as required by the size and capacity of the scale.

The base assembly includes end members 13 and side members 14 which are joined together at their ends by conventional means such as brazing or welding. These members extend in a horizontal direction and are substantially greater in length than in height, thereby forming a rectangular base of low profile. A cross-member 16 extends between the side members 14 at a position intermediate the end members 13. In the preferred embodiment, the end and side members are fabricated of a rigid channel stock, and the cross-member is a flat plate. Gusset plates 17 are attached to the lower surfaces of the end and side members at the corners of the base assembly.

The supporting framework includes a plurality of vertically extending posts 18 having generally flat upper surfaces upon which the platform rests. The posts 18 are mounted at opposite ends of structural cross-members 19 which extend in a direction generally parallel to the base end members 13 and in proximity thereto. Tie-bars 21 extend in a direction generally parallel to the frame side members 14 and interconnect the posts at corresponding ends of the cross-bars 19. Thus, the posts 18, structural members 19 and tie-bars 21 form a rigid framework which lies substantially within the region defined by the end and side members of the base assembly.

Figure 3:
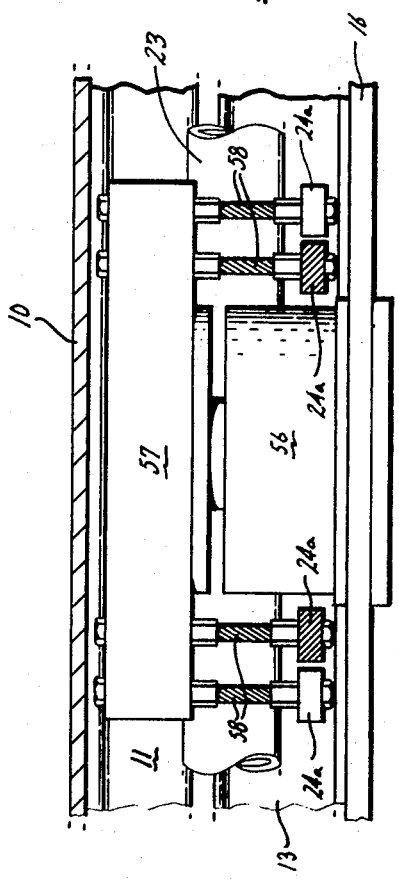
FIG. 3, is a cross-sectional view taken along line 3—3 in FIG. 1.

A pair of simple lever arms 22 is provided for transferring forces produced by a load on the platform to the load cell. Each of these lever arms includes a torque transmitting member 23 disposed generally parallel and proximate to one of the base assembly end members and a pair of arm portions 24 which extend from the torque transmitting member in a direction generally perpendicular thereto. Each of the arm portions 24 has a free end 24a generally proximate to the load cell. One or more bracing members 26 extend between the arm portions of each of the lever arms to provide strength and rigidity to the lever arms. The arm portions of the lever arms are spaced apart by different distances to provide clearance between the free ends. As is most clearly illustrated in FIG. 3, the free ends of the arm portions of each lever arm are substantially equidistant from the load cell.

Forces are transmitted from the platform and platform supporting framework to the lever arms through a plurality of flexure plate assemblies 31. One such assembly is provided at each of the ends of the torque transmitting members 23 of the lever arms. Each flexure plate assembly includes a fulcrum flexure plate 32 extending between the base assembly and the torque transmitting member and a load flexure plate 33 extending between the torque transmitting member and the platform supporting framework. Each of these flexure plates is a generally rectangular member fabricated of a flexible material such as a steel alloy. The base assembly is formed to include a vertically extending post 34 at each of its corners, and the upper portion in each of the fulcrum flexure plates 32 is secured to one of these posts by means of bolts 36, a spacer block 37, and a clamping block 38. Rectangular mounting blocks 41 are provided at each end of the torque transmitting portions of the lever arms. Each of these mounting blocks includes a lower ear portion 42 to which the lower portion of the fulcrum flexure plate 32 is secured by means of bolts 44 and a clamping block 46. Each of the mounting blocks 41 also includes an upper ear portion 47 to which the upper portion of the load flexure plate 33 is secured by means of bolts 48 and a clamping block 49. The lower portion of the load flexure plate 33 is secured to the cross-arm 19 of the platform supporting framework by means of bolts 51 and a clamping block 52.

The load cell, designated by the reference numeral 56, is a hydraulic transducer which is mounted on the cross-member 16 of the base assembly. This load cell comprises a cylinder containing a hydraulic fluid and a movable piston which varies the pressure intensity of the fluid in accordance with the force applied to the piston. The load cell can be connected by a conventional hydraulic line to a conventional pressure gauge which can be located remotely of the remainder of the scale. The pressure gauge can be calibrated in units of weight to provide a direct indication of the weight of an object on the platform of the scale.

Forces are transferred from the lever arms to the load cell piston by means of a load transfer bar 57 and flexible cables 58. The transfer bar rests upon the piston of the load cell, and the cables 58 extend vertically between the transfer bar and the free ends 24a of the arm portions of the lever arms. The cables connected to the free ends of the arm portions of each lever arm equally spaced from the load cell, and the cables are positioned to flex about centers located in the same general horizontal plane as the flexure plates 32 and 33. Alternatively, if desired, the transfer bar can be connected to the lever arms by rigid members, such as bolts or tie rods, rather than flexible cables.

Check links are provided to reduce the effects of side forces applied to the scale and to prevent lateral motion or swaying of the platform member. Each of these check links include a flat elongate member 61 which is attached at its ends to the tie-bars 21 of the platform supporting framework by blocks 62 and at its center to the cross-member 16 of the base assembly by a post 63.

Operation and use of the scale can now be described briefly. A load placed on the platform member 10 exerts a downward force which is applied to the platform supporting framework through the post 18. This force is transmitted to the lever arms 22 through the flexure plate assemblies 31 nd produces a downward force at the free ends of the arm portions 24a. This downward force is applied to the load cell 56 through the flexible cables 58 and the transfer bar 57 to produce a change in pressure intensity in the hydraulic fluid in the load cell corresponding to the weight of the load applied to the platform member. This hydraulic signal is applied to a conventional pressure gauge to provide a direct reading of the weight of the load.

Utilizing the techniques of the present invention, a scale having a capacity on the order of 20,000 pounds can be constructed in a unit having a height on the order of 6 inches and a length and width on the order of 30 inches. Such a scale has an accuracy on the order of 0.1 per cent.

It is apparent from the foregoing that a new and improved scale has been provided. While only the presently preferred embodiment has been described, as will be apparent to those familiar with the art, certain changes and modifications can be made without departing from the scope of the invention as defined by the following claims.

I claim:

1. In a scale of the type having a platform for receiving a load to be weighed, a generally rectangular base including horizontally extending end and side members, each of said members having a vertical height substantially less than its length, said base also including a cross-member extending between two of said end and side members, a framework disposed substantially within the region defined by said end and side members for supporting the platform in a position above said base, a pair of levers disposed in said region, each of said levers having a pivot head portion and a pair of spaced apart lever arms extending therefrom the arms of one lever lying farther apart than the arms of the other lever and embracing the same, flexure means interconnecting the platform framework and said levers in such manner that a force exerted by a load on said platform is transmitted to the lever arms, said flexure means including fulcrum flexure plates mounting the pivot head portions of said levers to the side members of said base and load flexure plates connecting the platform framework to said pivot head portions, said load flexure plates being spaced apart from and generally parallel to said fulcrum flexure plates, output transducer means mounted on said cross-member within the region defined by the end and side members, and means interconnecting the lever arms and said output transducer means in such manner that the force transmitted to the lever arms is applied to the transducer means to produce an output signal corresponding to the load applied to said platform.

2. A scale as in claim 1 wherein said output transducer means includes a hydraulic load cell.

3. A scale as in claim 1 wherein the means interconnecting the lever arms and output transducer means includes a flexible cable, said cable and said flexure plates all flexing about centers lying in substantially the same horizontal plane.

4. A scale as in claim 1 further including a check link member connected between the platform framework and said base to prevent swaying of the platform.

5. In a scale, a rigid base, a platform surmounting said base for receiving a load to be weighed, a pair of levers each having a pivot head portion and a pair of spaced apart arms extending therefrom the arms of one lever lying farther apart than the arms of the other lever and embracing the same, vertically extending fulcrum flexure plates connecting the pivot head portions of said levers to said base, means including vertically extending load flexure plates connecting the platform to said pivot head portions, said load flexure plates being spaced apart from and generally parallel to said fulcrum flexure plates, an output transducer carried by said base between the levers for producing an output signal corresponding to the force applied thereto, and means including flexible cables connecting the lever arms to said transducer.

6. A scale as in claim 5 wherein said output transducer comprises a hydraulic cylinder.

* * * * *